United States Patent
Majumdar et al.

(10) Patent No.: US 10,371,312 B2
(45) Date of Patent: Aug. 6, 2019

(54) SELECTIVELY ROTATABLE FEET FOR AN APPARATUS

(71) Applicant: Microsoft Technology Licensing, LLC, Redmond, WA (US)

(72) Inventors: Shalini Joshi Majumdar, Redmond, WA (US); Chau Van Ho, Des Moines, WA (US); Bo Dan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 15/365,583

(22) Filed: Nov. 30, 2016

(65) Prior Publication Data

US 2018/0149305 A1     May 31, 2018

(51) Int. Cl.
| | |
|---|---|
| *F16M 11/14* | (2006.01) |
| *G06F 1/16* | (2006.01) |
| *F16M 11/42* | (2006.01) |
| *F16M 11/20* | (2006.01) |
| *G06F 3/0489* | (2013.01) |

(52) U.S. Cl.
CPC ......... *F16M 11/42* (2013.01); *F16M 11/2014* (2013.01); *F16M 11/2085* (2013.01); *F16M 11/2092* (2013.01); *G06F 1/1601* (2013.01); *G06F 3/04897* (2013.01); *F16M 2200/022* (2013.01); *G06F 2200/1612* (2013.01)

(58) Field of Classification Search
None
See application file for complete search history.

(56) References Cited

U.S. PATENT DOCUMENTS

| | | | | |
|---|---|---|---|---|
| 5,875,578 | A * | 3/1999 | Grewe | G09F 15/0056 248/346.2 |
| 5,878,518 | A * | 3/1999 | Grewe | G09F 15/0056 248/910 |
| 6,633,286 | B1 * | 10/2003 | Do | B64D 11/0015 345/204 |
| 7,035,092 | B2 | 4/2006 | Hillman et al. | |
| 7,140,581 | B1 * | 11/2006 | White | E04H 12/2246 248/129 |

(Continued)

OTHER PUBLICATIONS

"Microsoft Surface Hub: Rolling Stand Assembly and Mounting Guide (55"/87")", https://www.google.co.in/url?sa=t&rct=j&q=&esrc=s&source=web&cd=7&ved=0ahUKEwilyvjRqa_PAhWINY8KHRW9DvYQFgguMAY&url=http%3A%2F%2Fdownload.microsoft.com%2Fdownload%2F7%2F0%2F2%2F702485E3-B55E-4DE8-B5DD-3B56F90DCF5D%2FSurface_Hub_Mounting_Guide_Rolling_Stand_Mounting_and_Assembly_Guide-EN.pdf&usg=AFQjCNEgoXtaPiwLv1Mb-B7v36wZy0yo7Q&sig2=w58E_GFccuPs20iS_CSZgQ&cad=rja, 2015, 14 pages.

(Continued)

*Primary Examiner* — Xanthia C Cunningham
(74) *Attorney, Agent, or Firm* — Rainier Patents, P.S.

(57) ABSTRACT

Techniques for selectively rotatable feet for an apparatus are described. According to various implementations, an apparatus includes feet on its base that cushion the apparatus on an adjacent surface, such as a desk, a table, and a floor. The feet are rounded (e.g., spherical) and can rotate relative to the base to enable the apparatus to be moved on an adjacent surface. To prevent unwanted movement during a typical usage, the apparatus includes brakes that engage with the feet to prevent rotation. The brakes, however, can be selectively disengaged from different feet to enable different types of movement of the apparatus, such as rotational and translational movement.

20 Claims, 11 Drawing Sheets

(56) References Cited

U.S. PATENT DOCUMENTS

| | | | | |
|---|---|---|---|---|
| 7,436,140 | B2* | 10/2008 | Takaji | F16M 11/08 248/349.1 |
| 7,584,563 | B2* | 9/2009 | Hillstrom | G09F 15/0056 248/346.2 |
| 7,878,476 | B2 | 2/2011 | Carson et al. | |
| 7,983,035 | B1* | 7/2011 | Ting | F16M 11/041 361/679.41 |
| 8,310,468 | B2 | 11/2012 | Martin | |
| 8,690,215 | B2* | 4/2014 | Cohen | B60R 13/00 296/21 |
| 8,887,423 | B1* | 11/2014 | Morgan | G08B 5/006 116/63 P |
| D735,510 | S* | 8/2015 | Volz | D6/708 |
| 10,127,844 | B2* | 11/2018 | Calby | G09F 15/0056 |
| 2005/0280636 | A1 | 12/2005 | Hildebrandt et al. | |
| 2006/0290687 | A1* | 12/2006 | Takaji | F16M 11/08 345/204 |
| 2007/0159784 | A1 | 7/2007 | Chen et al. | |
| 2008/0035808 | A1 | 2/2008 | Rawlings et al. | |
| 2008/0158446 | A1* | 7/2008 | Yan | B62B 5/04 348/836 |
| 2015/0101223 | A1* | 4/2015 | Adilman | G09F 7/22 40/606.02 |
| 2015/0189160 | A1* | 7/2015 | Auger | H04N 5/23216 348/142 |
| 2016/0073777 | A1* | 3/2016 | Zhang | F16M 11/42 248/125.7 |
| 2018/0012527 | A1* | 1/2018 | Struhl | G09F 15/0062 |

OTHER PUBLICATIONS

"Quick Reference: Smart Board™ Interactive Whiteboard Basics", https://www.teachit.co.uk/custom_content/Notebook/teachit/Smart 9 userguides/basics.pdf, 2005, 2 pages.

"Specifications SMART Mobile Height-Adjustable Floor Stand Model FS-UX", http://downloads.smarttech.com/media/sitecore/en/support/accessory/fs-ux/specifications/specfs-uxv09dec13.pdf, 2010, 5 pages.

"Twin Track Wall Board—4000mm", http://distribution.anders-kern.co.uk/product/1055, 2011, 2 pages.

"AVF LFT8000", http://www.touchboards.com/v11/lft8000/, Retrieved on: Sep. 26, 2016, 2 pages.

* cited by examiner

SELECTIVELY ROTATABLE FEET FOR AN APPARATUS

BACKGROUND

Many apparatus use some type of foot to prevent slippage and reduce damage to an adjacent surface. For instance, a desktop display device may include rubber feet on its base to prevent slippage on a desk and damage to the desk's surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for selectively rotatable feet for an apparatus are described. According to various implementations, an apparatus includes feet on its base that cushion the apparatus on an adjacent surface, such as a desk, a table, and a floor. The feet are rounded (e.g., spherical) and can rotate relative to the base to enable the apparatus to be moved on an adjacent surface. To prevent unwanted movement during a typical usage, the apparatus includes brakes that engage with the feet to prevent rotation. The brakes, however, can be selectively disengaged from different feet to enable different types of movement of the apparatus, such as rotational and translational movement.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Techniques for selectively rotatable feet for an apparatus are described. According to various implementations, an apparatus includes feet on its base that cushion the apparatus on an adjacent surface, such as a desk, a table, and a floor. The feet are rounded (e.g., spherical) and can rotate relative to the base to enable the apparatus to be moved on an adjacent surface. To prevent unwanted movement during a typical usage, the apparatus includes brakes that engage with the feet to prevent rotation. The brakes, however, can be selectively disengaged from different feet to enable different types of movement of the apparatus, such as rotational and translational movement. Thus, new classes of devices that diverge from traditional static positioning benefit from selectively rotatable feet to allow for different usage scenarios.

In the following discussion, an example environment is first described that may employ the techniques described herein. Implementations discussed herein are not limited to the example environment, and the example environment is not limited to implementations discussed herein. Next, example device orientations are discussed in accordance with one or more implementations. Following this, example hinges for support component attachment are discussed in accordance with one or more implementations. Next, a section entitled "Hinge Responsive Profile" discusses an example torque profile for hinge movement in accordance with one or more implementations. Finally, an example system and device are discussed that may implement various techniques described herein.

Figure 1:
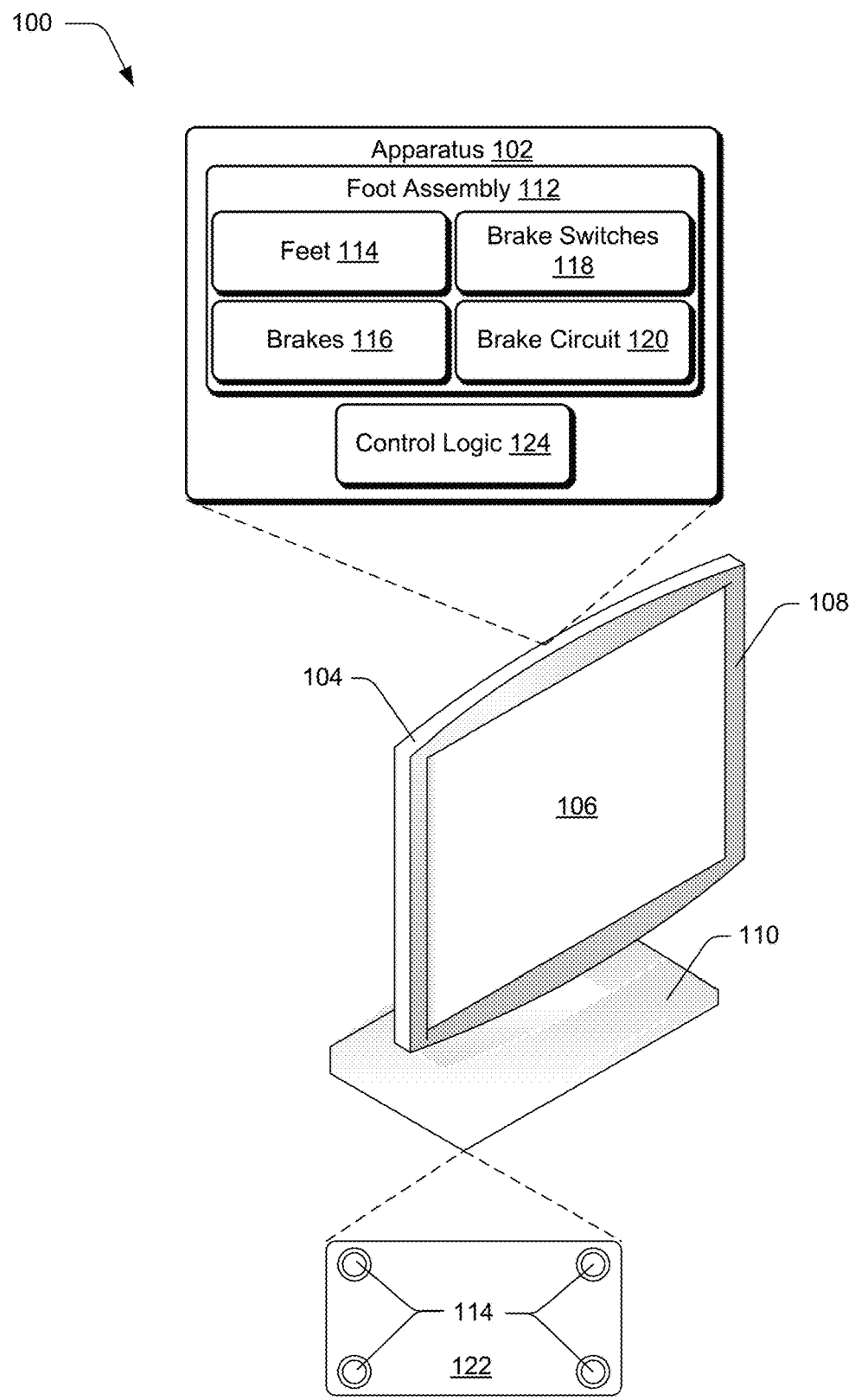
FIG. 1 is an illustration of an environment in an example implementation that is operable to employ the techniques described herein.

FIG. 1 is an illustration of an environment 100 in an example implementation that is operable to employ techniques described herein. The illustrated environment 100 includes an apparatus 102 with a casing 104, a display device 106 disposed within a front surface 108 of the casing 104, and a base 110 attached to the casing 104. The apparatus 102 may be configured in a variety of ways, such as a display device (e.g., a monitor), an all-in-one computing device, a television, and a large-scale interactivity device (e.g., a meeting room display/touch surface). These examples are not intended to be limiting, however, and the apparatus 102 may take a variety of forms not expressly discussed herein. But one example implementation of the apparatus 102 is discussed below with reference to FIG. 11.

According to various implementations, the casing 104 holds various internal components of the apparatus 102, such as electronics and other components discussed below with reference to the computing device 1102 of FIG. 11. The base 110 represents a portion of the apparatus 102 that supports the casing 104, such as on a desk, on the floor, and on a table.

The apparatus 102 further includes a foot assembly 112 that includes feet 114, brakes 116, brake switches 118, and a brake circuit 120. The feet 114 are disposed on a bottom surface 122 of the base 110, as illustrated in the lower portion of FIG. 1. Generally, the feet 114 function to reduce slippage of the base 110 (and thus the apparatus 102) on an adjacent surface, and to reduce surface damage to the adjacent surface that may be caused by the apparatus 102.

The brakes 116, the brake switches 118, and the brake circuit 120 represent components that enable the feet 114 to be selectably rotatable and non-rotatable on an adjacent surface. As further detailed below, the feet 114 can each include a different brake 116 that is controllable to either enable a respective foot 114 to rotate relative to the base 110, or to prevent the respective foot 114 from rotating relative to the base 110. The brake switches 118 represent switches that enable different respective brakes 116 to be applied or removed from respective feet 114 to either allow or restrict rolling movement of the respective feet 114. The brake circuit 120 represents functionality for controlling different operational aspects of the foot assembly 112, such as for connecting the brake switches 118 to the respective brakes 116.

The apparatus 102 further includes control logic 124, which is representative of functionality for controlling various operating aspects of the apparatus 102. In at least some implementations, the control logic 124 is operable to control operation of the brake switches 118 and/or the brakes 116. The control logic 124, for instance, can generate digital signals that enable different instances of the brakes 116 to be engaged and/or disengaged from different respective instances of the feet 114. In at least some implementations, the control logic can present user interface (UI) affordances that can receive user input to control operations of the foot assembly 112. For example, the control logic 124 can cause selectable controls to be displayed on the display device 106. As further detailed in the discussion of FIG. 9, such selectable controls can receive user input to enable control of various operational parameters of the foot assembly 112.

Figure 2:
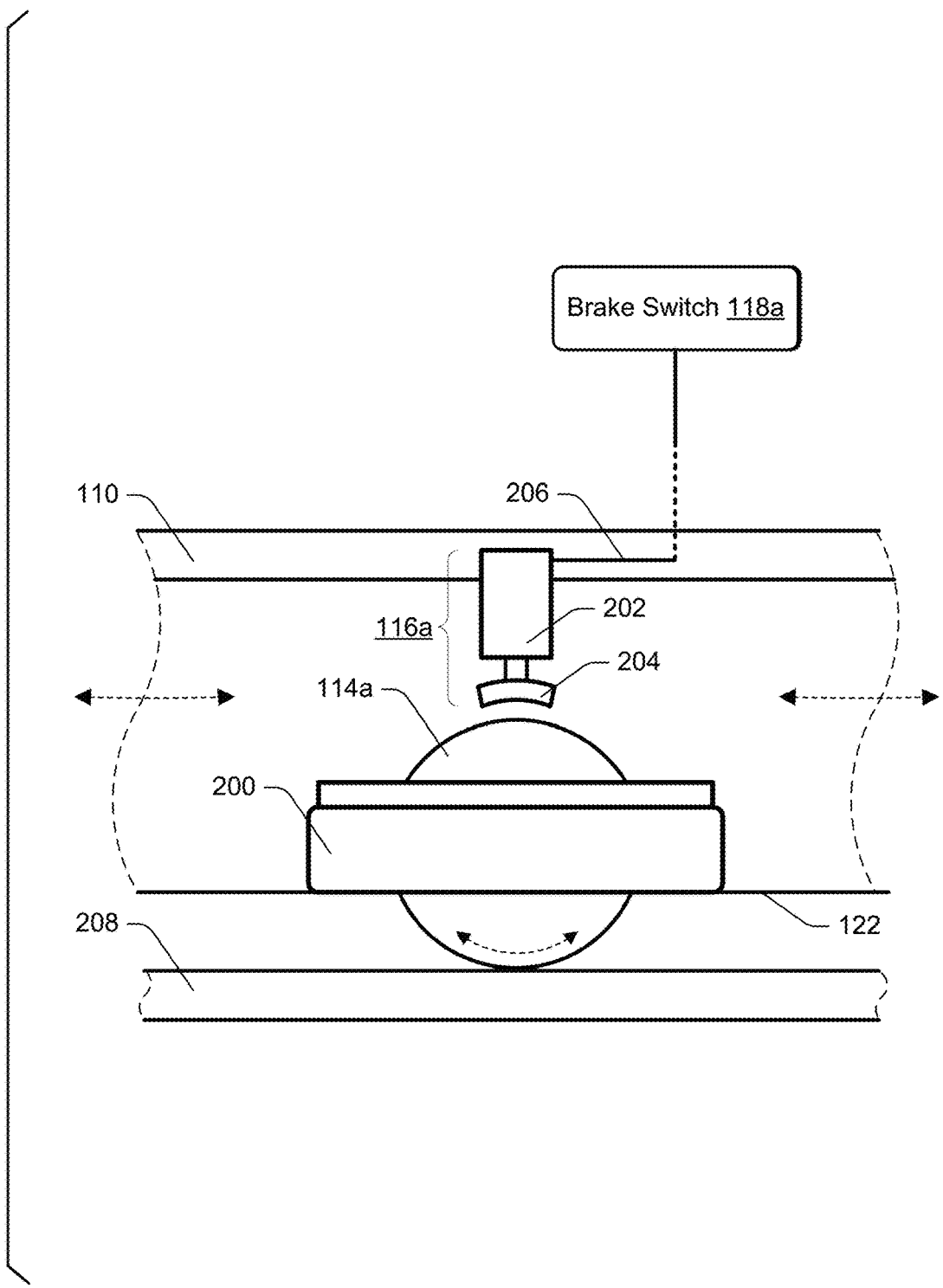
FIG. 2 depicts a partial side cross section of a portion of a base of an apparatus.

FIG. 2 depicts a partial side cross section of a portion of the base 110 of the apparatus 102, including a foot 114a, a bearing assembly 200, and a brake 116a. In this example implementation, the foot 114a is implemented as a sphere that is disposed within the bearing assembly 200 and that protrudes from the bottom surface 122 of the base 110. The foot 114a is captured within the bearing assembly 200 such that the foot 114a can rotate within the bearing assembly 200, but will not move out of (e.g., escape) the bearing assembly 200 unless significant external force is applied to the foot 114a. The foot 114a can be manufactured from any suitable material, such as silicone, plastic, and rubber. In at least some implementations, the foot 114a is formed from a slip-resistant material.

The brake 116a includes an actuator 202, a brake pad 204, and a brake control line 206. The actuator 202 is controllable to move (e.g., extend and retract) the brake pad 204 such that brake pad 204 can be selectively engaged with and disengaged from the foot 114a. For instance, as further detailed below, a control signal from a brake switch 118a can be applied across the control line 206 to release the brake pad 204 from the foot 114a, such as the position shown in FIG. 2.

With the brake pad 204 disengaged from (i.e., not in contact with) the foot 114a as shown in FIG. 2, the foot 114a can freely rotate within the bearing assembly 200. As further detailed below, different of the brakes 116 can be selected engaged and disengaged to disallow and allow movement of different feet 114 such that the base 110 can be moved translationally and/or rotated relative to an adjacent surface 208.

Figure 3:
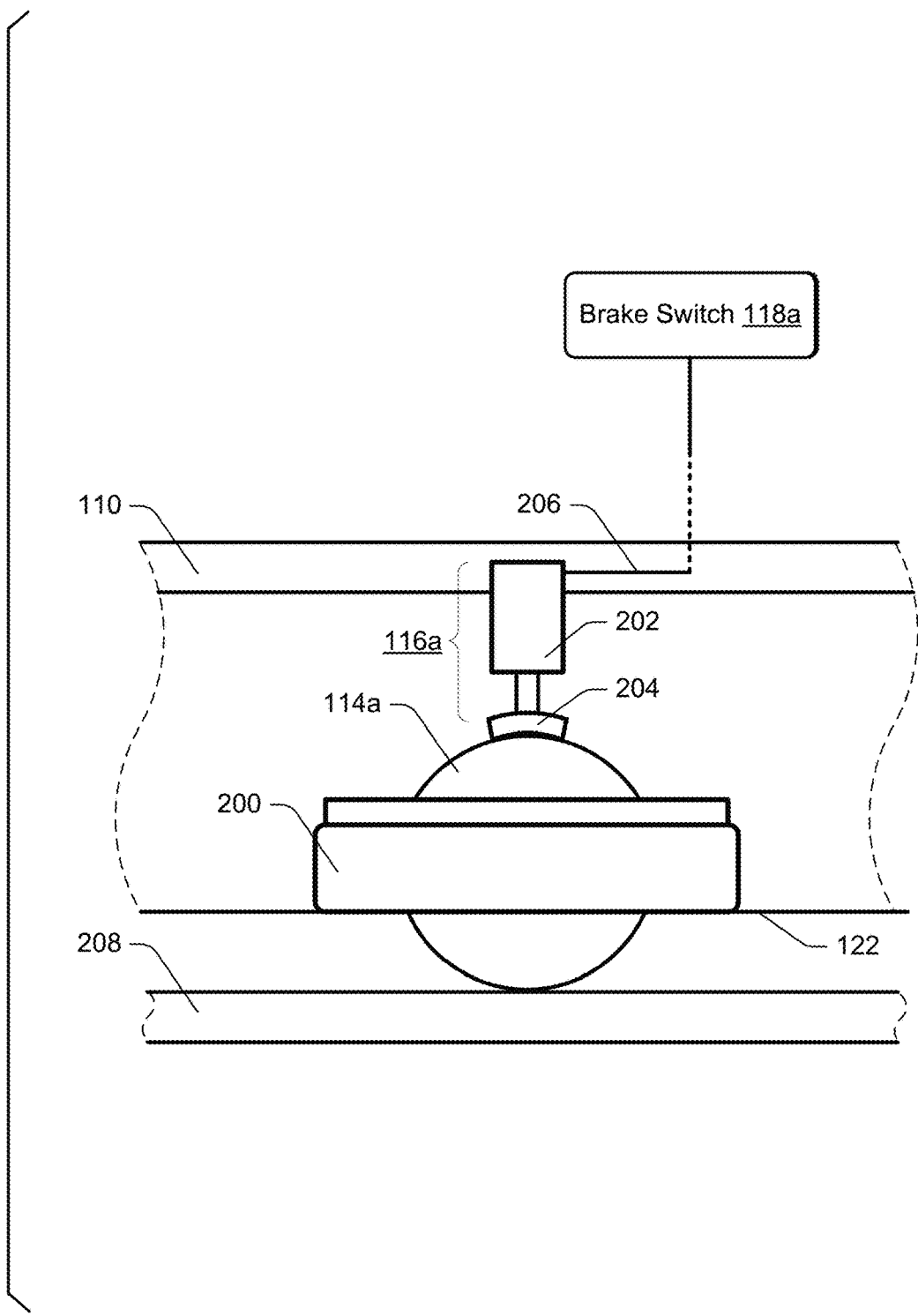
FIG. 3 depicts a partial side cross section of a portion of a base of an apparatus.

FIG. 3 depicts the partial side cross section of the portion of the base 110 of the apparatus 102 introduced above. Shown here is the brake pad 204 applied against the foot 114a. For instance, a control signal from the brake switch 118a across the control line 206 to the actuator 202 causes the actuator 202 to press the brake pad 204 against the foot 114a. Alternatively, this position represents a default position for the actuator 202 such that absent a control signal from the brake switch 118a to release the brake pad 204, the brake pad 204 is engaged against the foot 114a. Generally, engaging the brake pad 204 with the foot 114a causes the brake pad 204 to apply pressure against the foot 114a and restrict and/or prevent rotation of the foot 114a relative to the bearing assembly 200.

Figure 4:
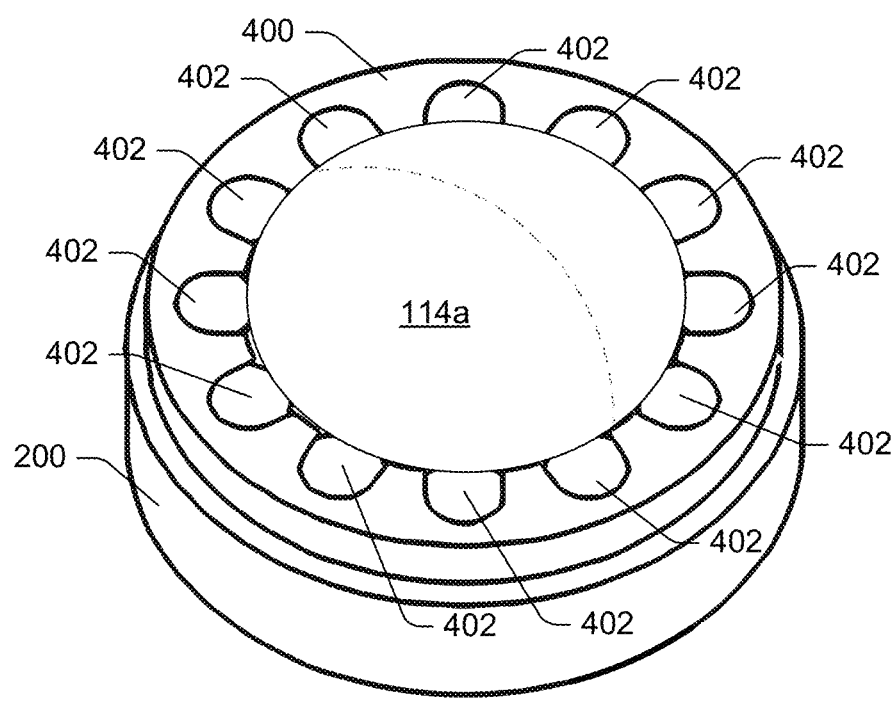
FIG. 4 depicts an underside view of a foot engaged within a bearing assembly.

FIG. 4 depicts an underside view of the foot 114a engaged within the bearing assembly 200 and separate from the base 110. The bearing assembly 200 includes a bearing housing 400 and bearings 402 rollably engaged within the bearing housing 400. In this particular example, the bearings 402 are implemented as ball bearings. Generally, the foot 114a is rotatably engaged within and protrudes from the bearing housing 400 such that the foot 114a can rotate with the bearings 402 in different directions. However, when the brake 116a is applied to the foot 114a, rotation of the foot 114a is restricted or prevented.

Generally, the different aspects and descriptions of the foot 114a discussed above apply to each of the feet 114. For instance, each of the feet 114 is disposed within a different respective bearing housing 400 and includes a respective brake 116 that can be engaged and disengaged to disallow and allow rotational movement of the feet 114 individually.

Figure 5:
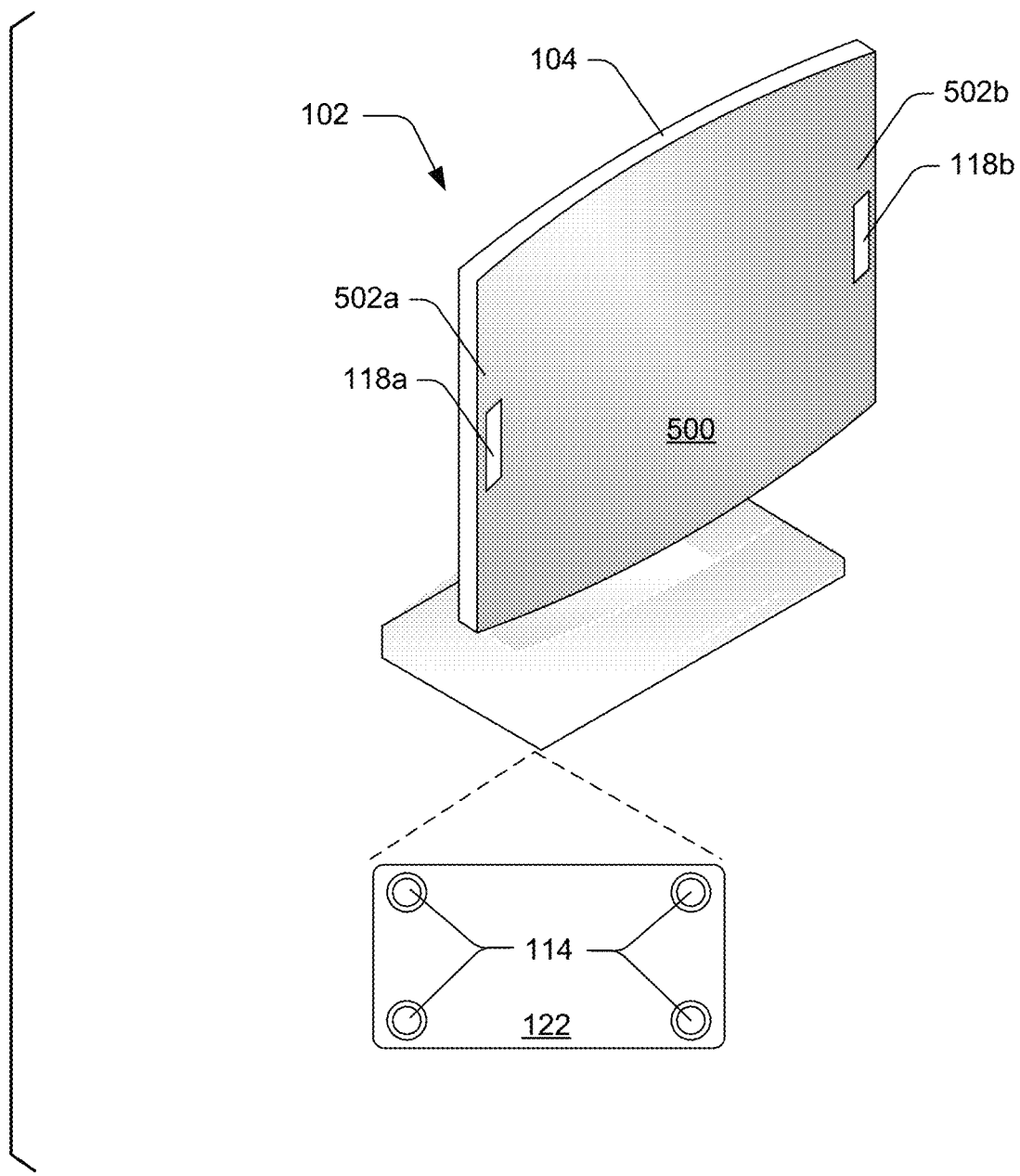
FIG. 5 depicts a back surface of a casing of an apparatus including brake switches.

FIG. 5 depicts a back surface 500 of the casing 104 of the apparatus 102 in accordance with one or more implementations. The back surface 500 includes the brake switch 118a and a brake switch 118b disposed on and/or within the back surface 500. According to implementations for selectively rotatable feet for an apparatus described herein, selecting the brake switch 118a and/or the brake switch 118b is effective to selectively disengage different of the feet 114. In this particular implementation, the brake switches 118a, 118b are positioned on the back surface 500 to facilitate selection of the brake switches 118a, 118b via a user grasping one or both of a side 502a and/or a side 502b of the casing 104 from the front of the apparatus 102. For instance, when the apparatus 102 is positioned on a desk, table, or other surface, a user can approach the apparatus 102 from the front and grasp one or both of the sides 502a, 502b to select either the brake switch 118a, the brake switch 118b, or both of the brake switches 118a, 118b.

According to various implementations, when the brake switches 118a are in an unselected state, the brakes 116 are engaged with the respective feet 114 to prevent rotation of the feet 114 relative to the base 110.

Figure 6:
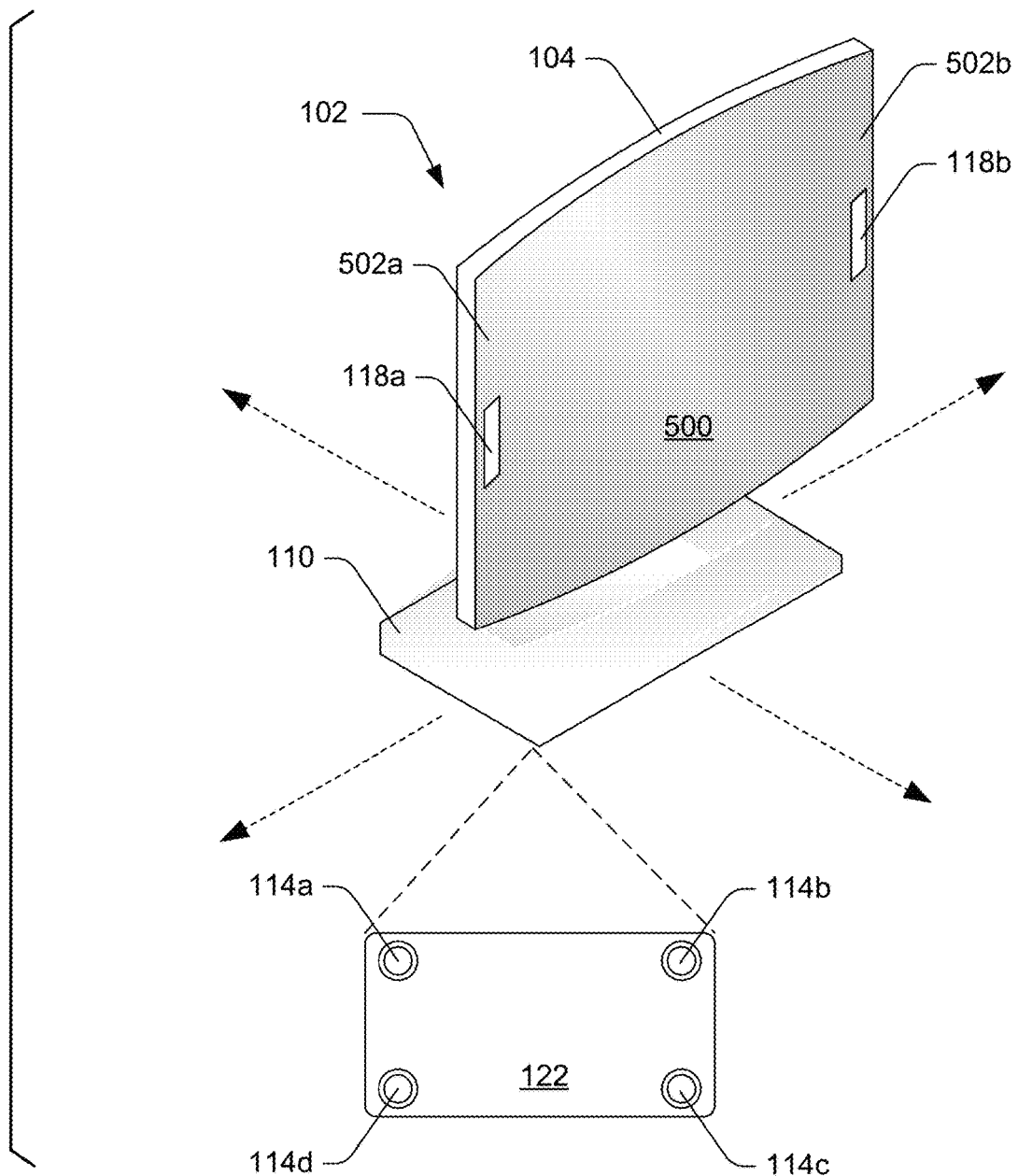
FIG. 6 depicts a back surface of a casing of an apparatus with multiple brake switches selected.

FIG. 6 depicts the back surface 500 of the casing 104 of the apparatus 102 in accordance with one or more implementations. In this particular implementation, the brake switches 118a, 118b are selected. A user, for instance, grasps the sides 502a, 502b such that the brake switches 118a, 118b are selected via the user's grasp. Accordingly, selecting the brake switches 118a, 118b causes brakes 116 for the foot 114a as well as for a foot 114b, a foot 114c, and a foot 114d to be disengaged. Accordingly, the feet 114a-114d can freely rotate relative to the base 110. Generally, rotation of the feet 114a-114d enables translational and/or rotational movement of the apparatus 102 on an adjacent surface. For instance, the user grasping the sides 502a, 502b of the casing 104 to select the brake switches 118a, 118b can move the apparatus 102, such as to bring the apparatus 102 closer to the user, move the apparatus 102 farther away from the user, move the apparatus 102 toward one side or another relative to the user, and rotate the apparatus 102.

Figure 7:
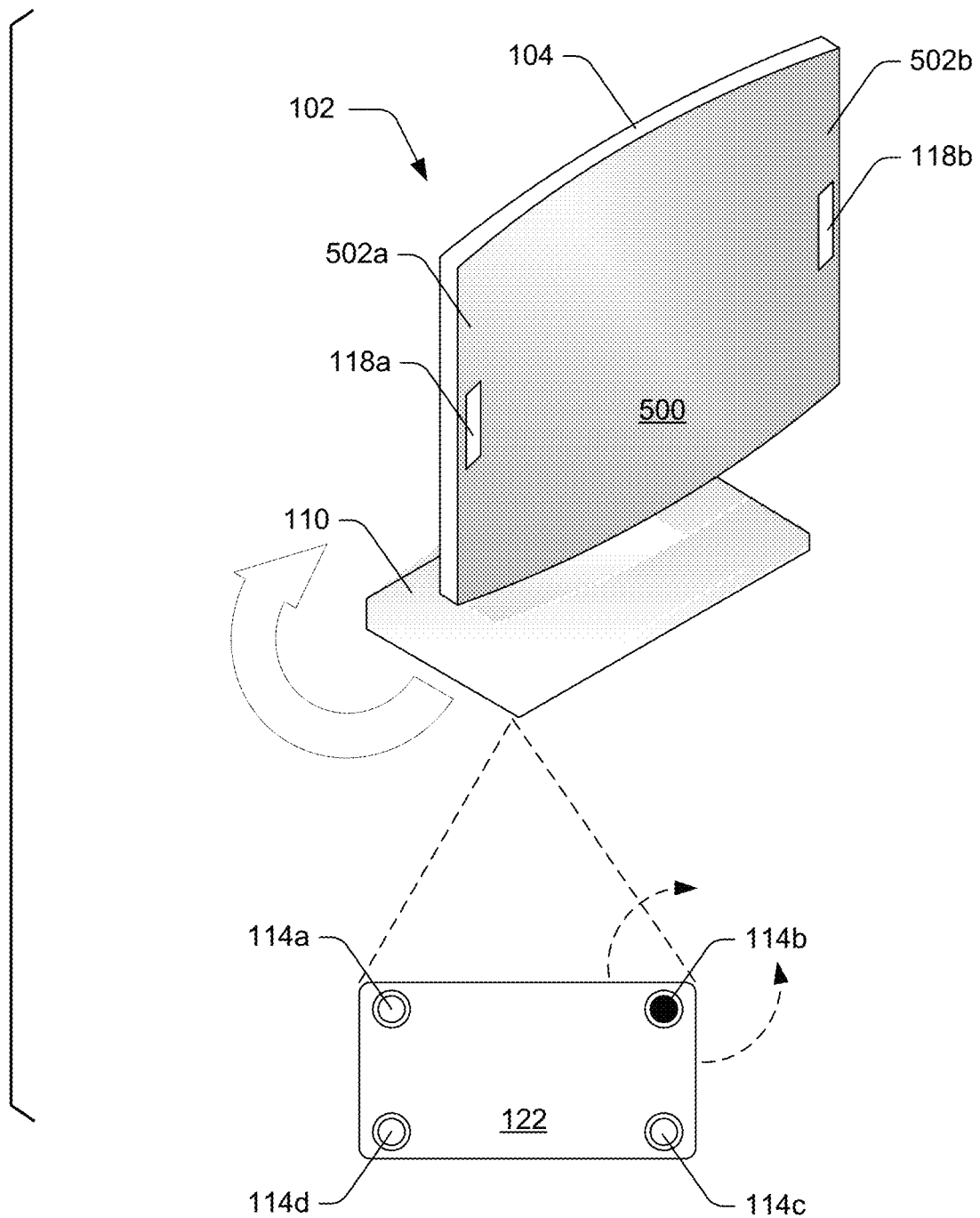
FIG. 7 depicts a back surface of a casing of an apparatus with a single brake switch selected.

FIG. 7 depicts the back surface 500 of the casing 104 of the apparatus 102 in accordance with one or more implementations. The brake switch 118a is selected but the brake switch 118b is not selected. A user, for instance, grasps the side 502a such that the brake switches 118a is selected via the user's grasp. Accordingly, selecting the brake switch 118a causes brakes 116 for the feet 114a, 114c, and 114d to be disengaged. The brake 116 for the foot 114b, however, remains engaged. Accordingly, the feet 114a, 114c, and 114d may freely rotate, but the foot 114b may not. By allowing the feet 114a, 114c, and 114d to rotate while preventing rotation of the foot 114b, the base 110 and thus the apparatus 102 may rotate on an adjacent surface by pivoting about the foot 114b. The foot 114b, for instance, acts as a pivot point while the feet 114a, 114c, and 114d rotate. Accordingly, a user can adjust a viewing angle of the apparatus 102 by pivoting the apparatus 102 about the foot 114b.

Figure 8:
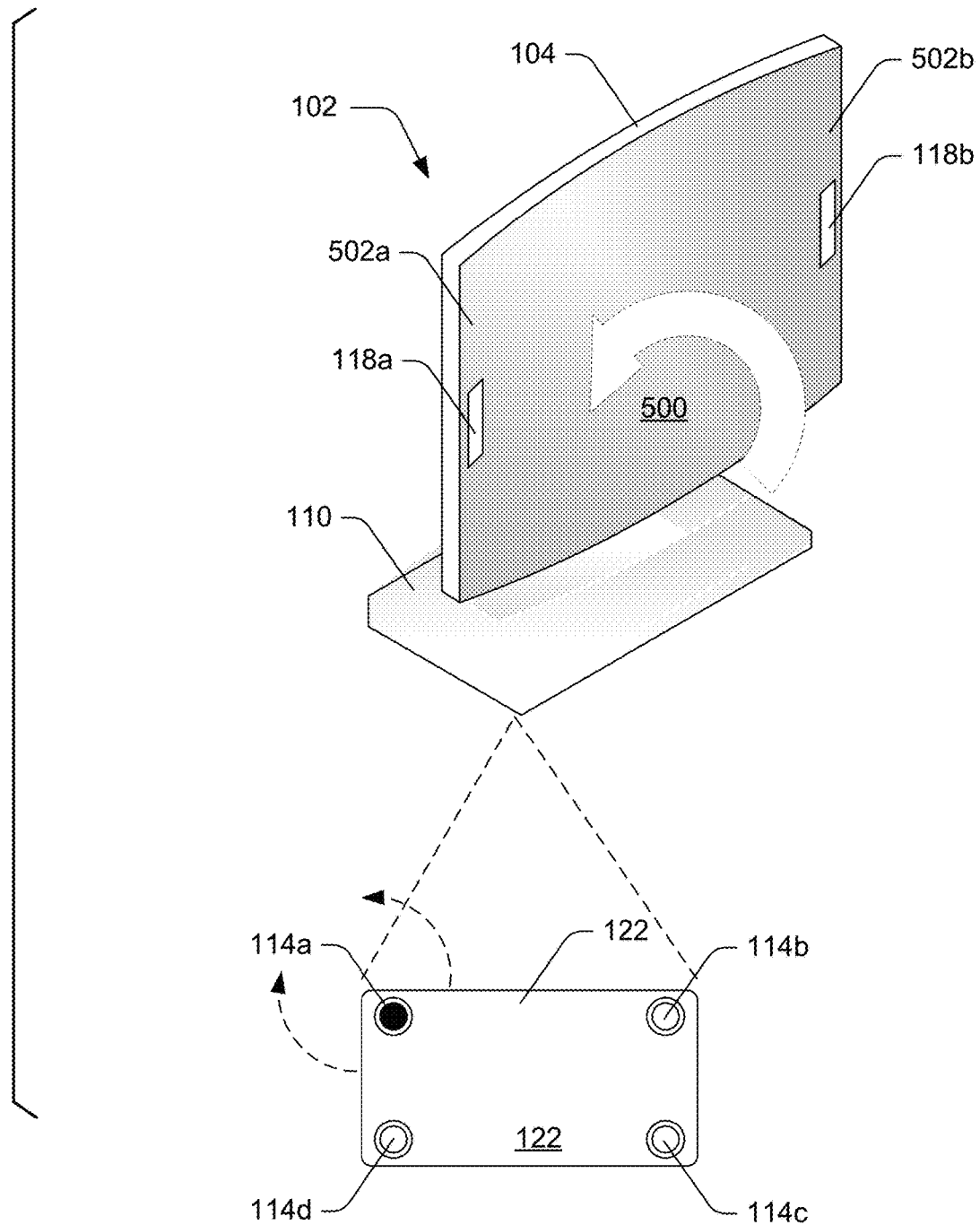
FIG. 8 depicts a back surface of a casing of an apparatus with a single brake switch selected.

FIG. 8 depicts an implementation where the brake switch 118b is selected but the brake switch 118a is not selected. A user, for instance, grasps the side 502b such that the brake switch 118b is selected via the user's grasp. Accordingly, selecting the brake switch 118b causes brakes 116 for the feet 114b, 114c, and 114d to be disengaged. The brake 116 for the foot 114a, however, remains engaged. Accordingly, the feet 114b, 114c, and 114d may freely rotate, but the foot 114a may not. By allowing the feet 114b, 114c, and 114d to rotate while preventing rotation of the foot 114a, the base 110 and thus the apparatus 102 may rotate on an adjacent surface by pivoting about the foot 114a. The foot 114a, for instance, acts as a pivot point while the feet 114b, 114c, and 114d rotate. Accordingly, a user can adjust a viewing angle of the apparatus 102 by pivoting the apparatus 102 about the foot 114a.

Figure 9:
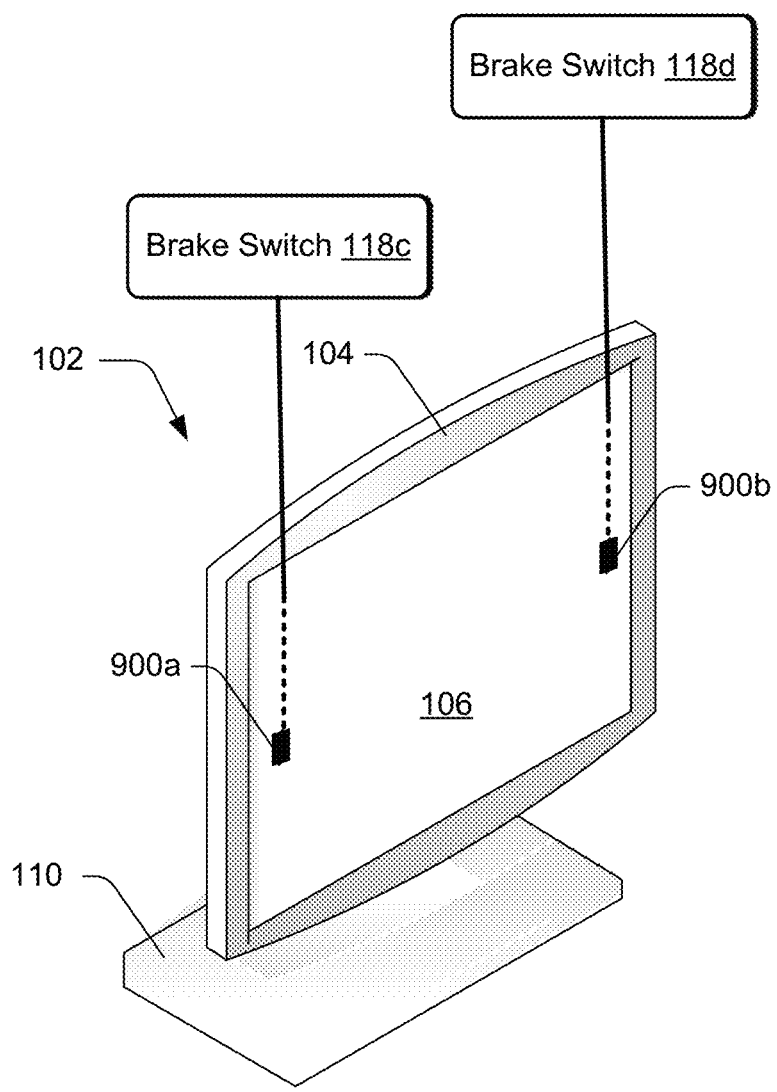
FIG. 9 depicts an example implementation where brakes are controllable via input interfaces of an apparatus.

FIG. 9 depicts an example implementation where the brakes 116 are controllable via input interfaces of the apparatus 102. In this particular example, the display device 106 displays a brake control 900a and a brake control 900b. The brake controls 900a, 900b, for instance, represent selectable icons or other controls that are displayed on the display device 106. The brake controls 900a, 900b may be presented by various functionalities executed by and/or hosted by the apparatus 102, such as an application, a service, and a system utility.

According to various implementations, the brake control 900a is selectable to cause selection of a brake switch 118c and the brake control 900b is selectable to cause selection of a brake switch 118d. Generally, selection of one or both of the brake controls 900a, 900b generates a digital signal that causes selection of one or both of the brake switches 118c, 118d. The brake switches 118c, 118d, for instance, are disposed internally within the casing 104 and/or the base 110 and are selectable via input to the brake controls 900a, 900b to selectively cause the brakes 116 to disengage. For instance, the implementations discussed above with reference to the brake switches 118a, 118b additionally or alternatively apply to selection of the brake control 900a, the brake control 900b, and/or both the brake controls 900a, 900b. The brake controls 900a, 900b are selectable in various ways, such as via touch input to the display device 106, input using an input device, such as a mouse and cursor and/or a keyboard, touchless gesture input detected via a camera of the apparatus 102.

While the implementations depicted above are presented with reference to a particular arrangement of feet and brake actuation, it is to be appreciated that a variety of other arrangements may be employed within the scope of the general implementations discussed herein. For instance, different arrangements of feet and brake actuation may be employed. With reference to the implementations discussed above, for example, feet other than the feet 114a, 114b may be used at pivot points for pivoting the apparatus 102.

Further, the placement and selection of the brake switches 118 can vary from that depicted in the accompanying drawings. For instance, instead of manually activated switches, the switches 118 may be implemented as digitally-activated switches that can be selected via a digital signal such as in response to user input to an application and/or a system utility executed by the apparatus 102.

The following discussion describes an example procedure for selectively rotatable feet for an apparatus in accordance with one or more embodiments. The example procedure may be employed in the environment 100 of FIG. 1, the system 1100 of FIG. 11, and/or any other suitable environment. The procedure, for instance, represents a procedure for implementing the example implementation scenarios discussed above. In at least some embodiments, the steps described for the procedure can be implemented automatically and independent of user interaction.

Figure 10:
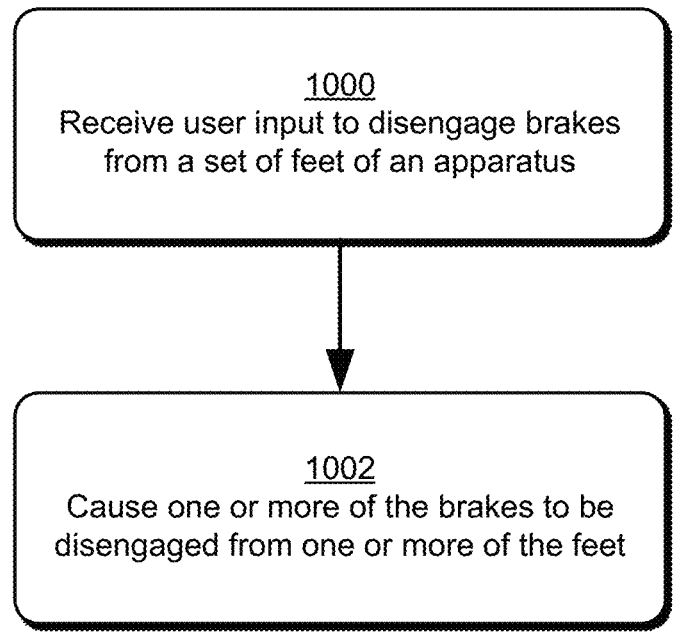
FIG. 10 is a flow diagram that describes steps in a method for selectively rotatable feet for an apparatus.

FIG. 10 is a flow diagram that describes steps in a method in accordance with one or more embodiments. The method describes an example procedure for selectively rotatable feet for an apparatus in accordance with one or more implementations.

Step 1000 receives user input to disengage brakes from a set of feet of an apparatus. A user, for instance, selects one or both of the brake switches 118a, 118b, or one or both of the brake controls 900a, 900b.

Step 1002 causes one or more of the brakes to be disengaged from one or more of the feet. For instance, user selection of one or both of the brake switches 118a, 118b causes some or all of the brakes 116 to be disengaged from the feet 114. Alternatively, user selection of one or both of the brake controls 900a, 900b causes some or all of the brakes 116 to be disengaged from the feet 114.

As described above, selectively disengaging different brakes 116 enables different feet 114 to be rollable to allow for pivoting and translational movement of an apparatus.

While the scenarios described herein are discussed with reference to four feet each having a selectively engageable brake, this is not to be construed as limiting on the claimed implementations. For instance, implementations for selectively rotatable feet for an apparatus may utilize any number and arrangement of feet. For instance, with reference to the apparatus 102, some of the feet 114 may not have a respective brake 116 while others of the feet 114 have brakes 116. Thus, a subset of the feet 114 may have selectively engageable brakes to control movability of the apparatus 102, while others of the feet 114 are freely rotatable.

Having discussed an example procedure for selectively rotatable feet for an apparatus, consider now an example system and device in accordance with one or more implementations.

Figure 11:
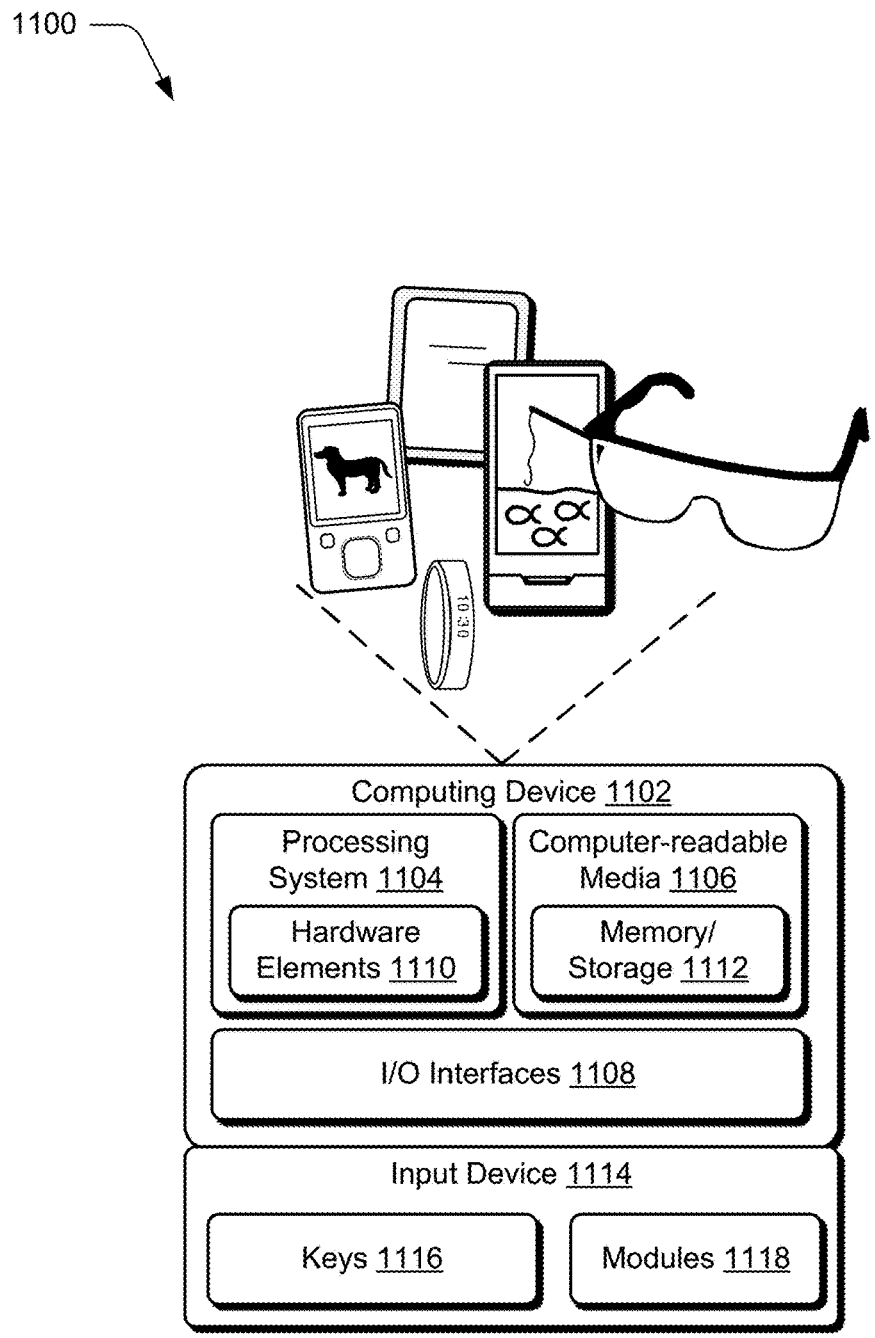
FIG. 11 illustrates an example system including various components of an example device that can be implemented as any type of computing device as described with reference to FIGS. 1-10 to implement examples of the techniques described herein.

FIG. 11 illustrates an example system generally at 1100 that includes an example computing device 1102 that is representative of one or more computing systems and/or devices that may implement the various techniques described herein. In at least some implementations, the computing device 1102 represents an implementation of the apparatus 102 discussed above. The computing device 1102 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the apparatus 102 may be implemented as a wearable device, such as a smart watch and smart glasses.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, and magnetic disks). The memory/storage component 1112 may include fixed media (e.g., RAM, ROM, a fixed hard drive, and so on) as well as removable media (e.g., Flash memory, a removable hard drive, and an optical disc). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), and a camera (e.g., which may employ visible or non-visible wavelengths, such as infrared frequencies to recognize movement as gestures that do not involve touch). Examples of output devices include a display device (e.g., a monitor or projector), speakers, a printer, a network card, and a tactile-response device. Thus, the computing device 1102 may be configured in a variety of ways to support user interaction.

The computing device 1102 is further illustrated as being communicatively and physically coupled to an input device 1114 that is physically and communicatively removable from the computing device 1102. In this way, a variety of different input devices may be coupled to the computing device 1102 having a wide variety of configurations to support a wide variety of functionality. In this example, the input device 1114 includes one or more keys 1116, which may be configured as pressure sensitive keys, mechanically switched keys, and so forth.

The input device 1114 is further illustrated as include one or more modules 1118 that may be configured to support a variety of functionality. The one or more modules 1118, for instance, may be configured to process analog and/or digital signals received from the keys 1116 to determine whether a keystroke was intended, determine whether an input is indicative of resting pressure, support authentication of the input device 1114 for operation with the computing device 1102, and so on.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

An apparatus comprising: a casing in which one or more electrical components are disposed; a base portion attached to the casing; feet disposed on the base portion and that at least partially protrude from the base portion; brakes disposed within the base portion and that are operable to engage and disengage with different respective feet; and a first brake switch and a second brake switch that are individually selectable to cause the brakes to be selectively disengaged from one or more of the feet such that: selection of the first brake switch without selection of the second switch causes a first brake for a first foot of the feet to disengage from the first foot while a second brake for a second foot of the feet is engaged with the second foot to allow the first foot to rotate relative to an adjacent surface and prevent the second foot from rotating relative to the adjacent surface such that the base portion is pivotable on the adjacent surface relative to the second foot; and selection of the first switch and the second switch causes the first brake and the second brake to disengage from the first foot and the second foot, respectively, such that the first foot and the second foot are rotatable on the adjacent surface to allow for translational movement of the base portion relative to the adjacent surface.

In addition to any of the above described apparatus, any one or combination of: wherein the apparatus further comprises a display device disposed within the casing wherein the apparatus further comprises a display device disposed on a front surface of the casing, and the first brake switch and the second brake switch are disposed on a rear surface of the casing; wherein the apparatus further comprises a display device disposed on a front surface of the casing, the first brake switch is disposed on a rear surface of the casing adjacent a first side of the casing, and the second brake switch is disposed on the rear surface of the casing adjacent a second side of the casing opposite the first side of the casing; wherein the first brake switch and the second brake switch are disposed on the casing; wherein the feet include one or more other feet, and wherein selection of the first brake switch without selection of the second brake switch causes the first brake for the first foot to disengage from the first foot, and causes one or more other brakes to disengage from the one or more other feet such that the first foot and the one or more other feet are rotatable on the adjacent surface; wherein selection of the second brake switch without selection of the first brake switch causes the second brake for the second foot to disengage while the first brake for the first foot is engaged to allow the second foot to rotate relative to the adjacent surface and the base portion to pivot on the adjacent surface relative to the first foot; wherein the feet include one or more other feet, and wherein selection of the second brake switch without selection of the first brake switch causes the second brake for the second foot to disengage and one or more other brakes to disengage from the one or more other feet while the first brake for the first foot is engaged to allow the second foot and the one or more other feet to rotate relative to the adjacent surface and the base portion to pivot on the adjacent surface relative to the first foot; further comprising a first bearing mechanism and a second bearing mechanism disposed within the base portion, wherein the first foot is mounted within the first bearing mechanism such that the first foot is rotatable relative to the base portion when the first brake is disengaged from the first foot, and the second foot is mounted within the second bearing mechanism such that the second foot is rotatable relative to the base portion when the second brake is disengaged from the second foot; wherein the first foot and the second foot comprise different respective spheres disposed partially within the base portion and that protrude from a bottom surface of the base portion.

An electronic device comprising: a casing with a front surface and a rear surface; a display device disposed on the front surface of the casing; a base portion attached to the casing and positioned to support the casing on an adjacent surface; feet disposed on the base portion and that at least partially protrude from the base portion; brakes disposed within the base portion and that are operable to engage and disengage with different respective feet; and a first brake switch and a second brake switch that are individually selectable to cause the brakes to be selectively disengaged from the feet such that: selection of the first brake switch without selection of the second switch causes a first brake for first foot of the feet to disengage while a second brake for a second foot of the feet is engaged to allow the first foot to rotate relative to an adjacent surface and the base portion to pivot on the adjacent surface relative to the second foot; and selection of the first switch and the second switch causes the first brake and the second brake to disengage such that the first foot and the second foot are rotatable on the adjacent surface to allow for translational movement of the base portion relative to the adjacent surface.

In addition to any of the above described electronic devices, any one or combination of: wherein the first brake switch is disposed on the rear surface of the casing and adjacent a first side of the casing, and the second brake switch is disposed on the rear surface of the casing and adjacent a second side of the casing opposite the first side; wherein: the first brake switch is disposed on the rear surface of the casing and adjacent a first side of the casing such that the first brake switch is selectable via a user grasping the first side of the casing; and the second brake switch is disposed on the rear surface of the casing and adjacent a second side of the casing opposite the first side such that the second brake switch is selectable via a user grasping the second side of the casing; wherein the first brake switch and the second brake switch are selectable via user input to a touch functionality displayed on the display device; wherein the first brake switch and the second brake switch are selectable via user input selecting a selectable control displayed on the display device; wherein the first brake switch and the second brake switch are selectable via one or more digital signals generated by control logic of the electronic device.

An apparatus comprising: a body portion; feet that are disposed on the body portion and that protrude at least partially from the body portion, the feet including a first foot, a second foot, and one or more other feet; brakes that are disposed within the body portion, the brakes including a first brake that is operable to engage and disengage with the first foot, a second brake that is operable to engage and disengage with the second foot, and one or more other brakes that are operable to engage and disengage with the one or more other feet; brake switches including: a first brake switch that is selectable to disengage the first brake from the first foot and disengage the one or more other brakes from the one or more other feet to allow the first foot and the one or more other feet to be rotatable on an adjacent surface and to allow pivoting movement of the body portion about the second foot and relative to the adjacent surface; and a second brake switch that is selectable to disengage the second brake from the second foot and disengage the one or more other brakes from the one or more other feet to allow the second foot and the one or more other feet to be rotatable on the adjacent surface and pivoting movement of the body portion about the first foot and relative to the adjacent surface.

In addition to any of the above described apparatus, any one or combination of: further comprising a casing, and wherein the body portion comprises a base portion attached to the casing and configured to support the casing on an adjacent surface; wherein the first brake is configured such that when the first brake switch is in an unselected state, the first brake is engaged with the first foot to restrict rotation of the first foot; wherein the first brake, the second brake, and the one or more other brakes are configured such then when the first brake switch and the second brake switch are in an unselected state, the first brake, the second brake, and the one or more other brakes are engaged with the first foot, the second foot, and the one or more other feet, respectively.

What is claimed is:

1. An apparatus comprising:
a casing in which one or more electrical components are disposed;
a base portion attached to the casing;
a plurality of feet disposed on the base portion and that at least partially protrude from the base portion;
brakes disposed within the base portion and that are operable to engage and disengage with different respective feet of the plurality; and
a first brake switch and a second brake switch that are individually selectable to cause the brakes to be selectively disengaged from one or more of the feet of the plurality such that:
selection of the first brake switch without selection of the second brake switch causes a first brake for a first foot of the plurality to disengage from the first foot while a second brake for a second foot of the plurality is engaged with the second foot to allow the first foot to rotate relative to an adjacent surface and prevent the second foot from rotating relative to the adjacent surface such that the base portion is pivotable on the adjacent surface relative to the second foot; and
selection of the first brake switch and the second brake switch causes the first brake and the second brake to disengage from the first foot and the second foot, respectively, such that the first foot and the second foot are rotatable on the adjacent surface to allow for translational movement of the base portion relative to the adjacent surface.

2. An apparatus as recited in claim 1, wherein the apparatus further comprises a display device disposed within the casing.

3. An apparatus as recited in claim 1, wherein the apparatus further comprises a display device disposed on a front surface of the casing, and the first brake switch and the second brake switch are disposed on a rear surface of the casing.

4. An apparatus as recited in claim 1, wherein the apparatus further comprises a display device disposed on a front surface of the casing, the first brake switch is disposed on a rear surface of the casing adjacent a first side of the casing, and the second brake switch is disposed on the rear surface of the casing adjacent a second side of the casing opposite the first side of the casing.

5. An apparatus as recited in claim 1, wherein the first brake switch and the second brake switch are disposed on the casing.

6. An apparatus as recited in claim 1, wherein the plurality of feet include one or more other feet, and wherein selection of the first brake switch without selection of the second brake switch causes the first brake for the first foot to disengage from the first foot, and causes one or more other brakes to disengage from the one or more other feet such that the first foot and the one or more other feet are rotatable on the adjacent surface.

7. An apparatus as recited in claim 1, wherein selection of the second brake switch without selection of the first brake switch causes the second brake for the second foot to disengage while the first brake for the first foot is engaged to allow the second foot to rotate relative to the adjacent surface and the base portion to pivot on the adjacent surface relative to the first foot.

8. An apparatus as recited in claim 1, wherein the plurality of feet include one or more other feet, and wherein selection of the second brake switch without selection of the first brake switch causes the second brake for the second foot to disengage and one or more other brakes to disengage from the one or more other feet while the first brake for the first foot is engaged to allow the second foot and the one or more other feet to rotate relative to the adjacent surface and the base portion to pivot on the adjacent surface relative to the first foot.

9. An apparatus as recited in claim 1, further comprising a first bearing mechanism and a second bearing mechanism disposed within the base portion, wherein the first foot is mounted within the first bearing mechanism such that the first foot is rotatable relative to the base portion when the first brake is disengaged from the first foot, and the second foot is mounted within the second bearing mechanism such that the second foot is rotatable relative to the base portion when the second brake is disengaged from the second foot.

10. An apparatus as recited in claim 1, wherein the first foot and the second foot comprise different respective spheres disposed partially within the base portion and that protrude from a bottom surface of the base portion.

11. An electronic device comprising:
   a casing with a front surface and a rear surface;
   a display device disposed on the front surface of the casing;
   a base portion attached to the casing and positioned to support the casing on an adjacent surface;
   a plurality of feet disposed on the base portion and that at least partially protrude from the base portion;
   brakes disposed within the base portion and that are operable to engage and disengage with different respective feet of the plurality; and
   a first brake switch and a second brake switch that are individually selectable to cause the brakes to be selectively disengaged from the different respective feet of the plurality such that:
   selection of the first brake switch without selection of the second brake switch causes a first brake for a first foot of the plurality of feet to disengage while a second brake for a second foot of the plurality of feet is engaged to allow the first foot to rotate relative to the adjacent surface and the base portion to pivot on the adjacent surface relative to the second foot; and
   selection of the first brake switch and the second brake switch causes the first brake and the second brake to disengage such that the first foot and the second foot are rotatable on the adjacent surface to allow for translational movement of the base portion relative to the adjacent surface.

12. An electronic device as recited in claim 11, wherein the first brake switch is disposed on the rear surface of the casing and adjacent a first side of the casing, and the second brake switch is disposed on the rear surface of the casing and adjacent a second side of the casing opposite the first side.

13. An electronic device as recited in claim 11, wherein:
   the first brake switch is disposed on the rear surface of the casing and adjacent a first side of the casing such that the first brake switch is selectable by grasping the first side of the casing; and
   the second brake switch is disposed on the rear surface of the casing and adjacent a second side of the casing opposite the first side such that the second brake switch is selectable by grasping the second side of the casing.

14. An electronic device as recited in claim 11, wherein the first brake switch and the second brake switch are selectable via user input to a touch functionality displayed on the display device.

15. An electronic device as recited in claim 11, wherein the first brake switch and the second brake switch are selectable via user input selecting a selectable control displayed on the display device.

16. An electronic device as recited in claim 11, wherein the first brake switch and the second brake switch are selectable via one or more digital signals generated by control logic of the electronic device.

17. An apparatus comprising:
   a body portion;
   feet that are disposed on the body portion and that protrude at least partially from the body portion, the feet including a first foot, a second foot, and one or more other feet;
   brakes that are disposed within the body portion, the brakes including a first brake that is operable to engage and disengage with the first foot, a second brake that is operable to engage and disengage with the second foot, and one or more other brakes that are operable to engage and disengage with the one or more other feet; and
   brake switches including:
      a first brake switch that is selectable to disengage the first brake from the first foot and disengage the one or more other brakes from the one or more other feet to allow the first foot and the one or more other feet to be rotatable on an adjacent surface and to allow pivoting movement of the body portion about the second foot and relative to the adjacent surface; and
      a second brake switch that is selectable to disengage the second brake from the second foot and disengage the one or more other brakes from the one or more other feet to allow the second foot and the one or more other feet to be rotatable on the adjacent surface and to allow pivoting movement of the body portion about the first foot and relative to the adjacent surface.

18. An apparatus as described in claim 17, further comprising a casing, and wherein the body portion comprises a base portion attached to the casing and configured to support the casing on the adjacent surface.

19. An apparatus as described in claim 17, wherein the first brake is configured such that when the first brake switch is in an unselected state, the first brake is engaged with the first foot to restrict rotation of the first foot.

20. An apparatus as described in claim 17, wherein the first brake, the second brake, and the one or more other brakes are configured such then when the first brake switch and the second brake switch are in an unselected state, the first brake, the second brake, and the one or more other brakes are engaged with the first foot, the second foot, and the one or more other feet, respectively.

* * * * *